United States Patent [19]
Blomgren, Sr. et al.

[11] 3,746,069
[45] July 17, 1973

[54] TIRE CHANGING APPARATUS AND METHOD FOR HANDLING RUN FLAT TIRES

[75] Inventors: Oscar C. Blomgren, Sr.; Oscar C. Blomgren, Jr., both of Lake Bluff, Ill.

[73] Assignee: Tuxco Corporation, Chicago, Ill.

[22] Filed: Sept. 16, 1971

[21] Appl. No.: 181,016

[52] U.S. Cl. .............................................. 157/1.26
[51] Int. Cl. ............................................ B60c 25/06
[58] Field of Search ...................... 157/1, 1.17, 1.26, 157/1.28, 1.3

[56] References Cited
UNITED STATES PATENTS

| | | |
|---|---|---|
| 2,832,400 | 4/1958 | Laughlin ........................... 157/1.28 |
| 3,489,198 | 1/1970 | Malinski ............................ 157/1.17 |
| 2,455,580 | 12/1948 | Hewitt ........................... 157/1.17 X |
| 2,560,885 | 7/1951 | Neville .............................. 157/1.3 |
| 3,362,453 | 1/1968 | Nester .............................. 157/1.17 |
| 3,426,827 | 2/1969 | Whited et al. ..................... 157/1.26 |

*Primary Examiner*—Granville Y. Custer, Jr.
*Attorney*—James B. Kinzer, Lloyd L. Zickert et al.

[57] ABSTRACT

Tire changing apparatus and method for mounting and demounting run flat tires onto wheels, including a tire stand having a hydraulic ram operating a disc for engaging a wheel and to coact with a bead braking shoe, and means for anchoring the tire and wheel to the stand when applying forces to move the bead of the tire over the rim of the wheel.

7 Claims, 25 Drawing Figures

Inventors
Oscar C. Blomgren, Sr.
Oscar C. Blomgren, Jr.

By Kinzer, Dorn & Zickert
Attorneys

Patented July 17, 1973

Inventors
Oscar C. Blomgren, Sr.
Oscar C. Blomgren, Jr.
By Kinzer, Dorn & Zickert
Attorneys

Inventors
Oscar C. Blomgren, Sr.
Oscar C. Blomgren, Jr.
By Kinzer, Dorn & Zickert
Attorneys

TIRE CHANGING APPARATUS AND METHOD FOR HANDLING RUN FLAT TIRES

This invention relates in general to a tire changing apparatus, and more particularly to a tire changing apparatus and method for handling run flat tubeless tires.

The invention concerns the mounting and demounting of run flat tubless tires, sometimes called run flat combat tires. The run flat tire has been recently developed, and in its deflated condition has the opposing side walls folded inwardly to provide cushioning for the tread wall and allow the tire to be run in deflated condition. The heretofore usual tire construction when deflated causes the side walls to spread generally outwardly wherein the tread wall will essentially engage the wheel rim in a non-uniform manner such that it is not possible to run on the tire except at a very low speed. The recently developed run flat tire is especially useful for combat vehicles crossing rough terrain and encountering situations where it is not feasible to change the tire. For example, should a run flat tire be punctured by a bullet, it would deflate and the side walls would fold inwardly to still provide a relatively uniform tire on the wheel which can be run at high speeds for many miles. Should this condition develop with one front tire, the other front tire could be easily deflated to eliminate any imbalance of the vehicle.

Since the side walls of the run flat tire must be capable of withstanding tremendous forces when in a deflated condition, it is necessary to build the side walls with substantial strength and rigidity which makes the tire extremely stiff and difficult to mount on and demount from a wheel. No known tire changing apparatus has proven satisfactory to enable the efficient changing of run flat tubeless tires.

Accordingly, the present invention overcomes the above difficulties in providing a tire changing apparatus and method for changing run flat tires whether at a garage installation or in the field. The apparatus of the invention is compact and portable, and constructed to enable a quick and easy mounting and demounting of run flat tires on wheels.

The tire changing apparatus of the invention includes a stand comprised of a base plate onto which the tire and wheel assembly may be supported in a vertical position. A hydraulic ram operated disc is mounted on the plate wherein the disc engages the rim on one side of the wheel. At the other side of the wheel a bead breaking shoe is fixedly mounted in an upstanding position from the base plate to engage the bead on one side of the tire and break the bead from the corresponding wheel rim upon application of a force to the disc which drives the wheel and tire assembly toward the bead breaking shoe. Following breaking of the bead from the rim at one point, the tire is rotated to successively break the bead along the entire rim. After the bead has been broken from the wheel rim, the wheel is held in place by advancing the ram until a locking lug or bar on the bead breaking shoe support overlies the rim and coacts with the bead breaking shoe to lock tire and wheel assembly in place on the tire stand. A bead depressor is then employed to depress the bead from the top of the wheel rim to permit the entry of tire irons which are used to force 30 to 40 percent of the bead over the wheel rim to the outside of the rim. The tire and wheel is next removed from the tire stand, placed on the floor with the side having the part of one bead outside the corresponding rim facing upward, and by using tire irons and the bead depressor, the one bead is completely removed from the wheel. The tire and wheel assembly with one bead removed is again placed on the tire stand and turned so that the other bead may be broken from the wheel rim by the same procedure as above outlined. Thereafter, the wheel and tire are removed from the tire stand and the tire can be completely removed from the wheel by use of tire irons. Removal of the wheel from the tire when one bead has been forced to the outside of the wheel rim is not difficult because of the drop center construction of the wheel.

Similarly, a wheel that is completely removed from a tire may be initially assembled with the tire to arrange one bead within the wheel rims by placing the wheel at an angle with respect to a part of the bead which is received in the drop center and applying a simple force on the other part of the wheel to drive it into the tire bead. This can be done by laying the tire on the floor when carrying out this operation. It is preferable to assemble the wheel with the tire so that the rear bead of the tire is in proper location with respect to the back rim of the tire, that is, it is on the wheel, it thereby being necessary only to bring the front bead of the tire over the front rim and onto the wheel. The wheel entire assembly is then placed in the machine with the back side of the wheel against the disc and the front side of the wheel toward the bead breaking shoe. Tire irons are used in connection with the bead breaking shoe to guide the lower outer tire bead under the rim of the wheel as the hydraulic ram urges the tire and wheel assembly toward the bead breaking shoe. After the tire and wheel is thus located in locked position with respect to the ram disc urging the front rim into locked position with the bead breaking shoe and locking bar, a steel tube is inserted through the disc and the wheel hub to provide a support for a bead ram that is mounted at the front side of the wheel. The bead ram includes a tube coacting with the tube extending through the disc and the wheel hub and a ram having a bead shoe. Tire irons are utilized with the bead ram shoe and when the bead is driven up over the wheel rim, the tire irons automatically assist in forcing the bead onto the wheel. When the bead ram is fully extended, the tire depressing tool can be utilized to complete the movement of the bead onto the wheel.

Accordingly, it is an object of the present invention to provide a new and improved tire changing apparatus and method for mounting and demounting run flat tires onto wheels.

Another object of the present invention is in the provision of a tire changing apparatus and method wherein the apparatus is compact and portable, and therefore capable of being used in a garage installation or in the field for handling run flat combat tires.

Other objects, features and advantages of the invention will be apparent from the following detailed disclosure, taken in conjunction with the accompanying sheets of drawings, wherein like reference numerals refer to like parts, in which:

FIGS. 1 to 11 are views generally illustrating the tire changing apparatus of the invention and the steps involved in removing the tire from the wheel;

FIGS. 12 to 24 illustrate the manner in which a tire is mounted onto a wheel in accordance with the successive steps necessary during the use of the tire changing apparatus of the present invention;

Figures 1, 2, 3, 4, 5, 6:
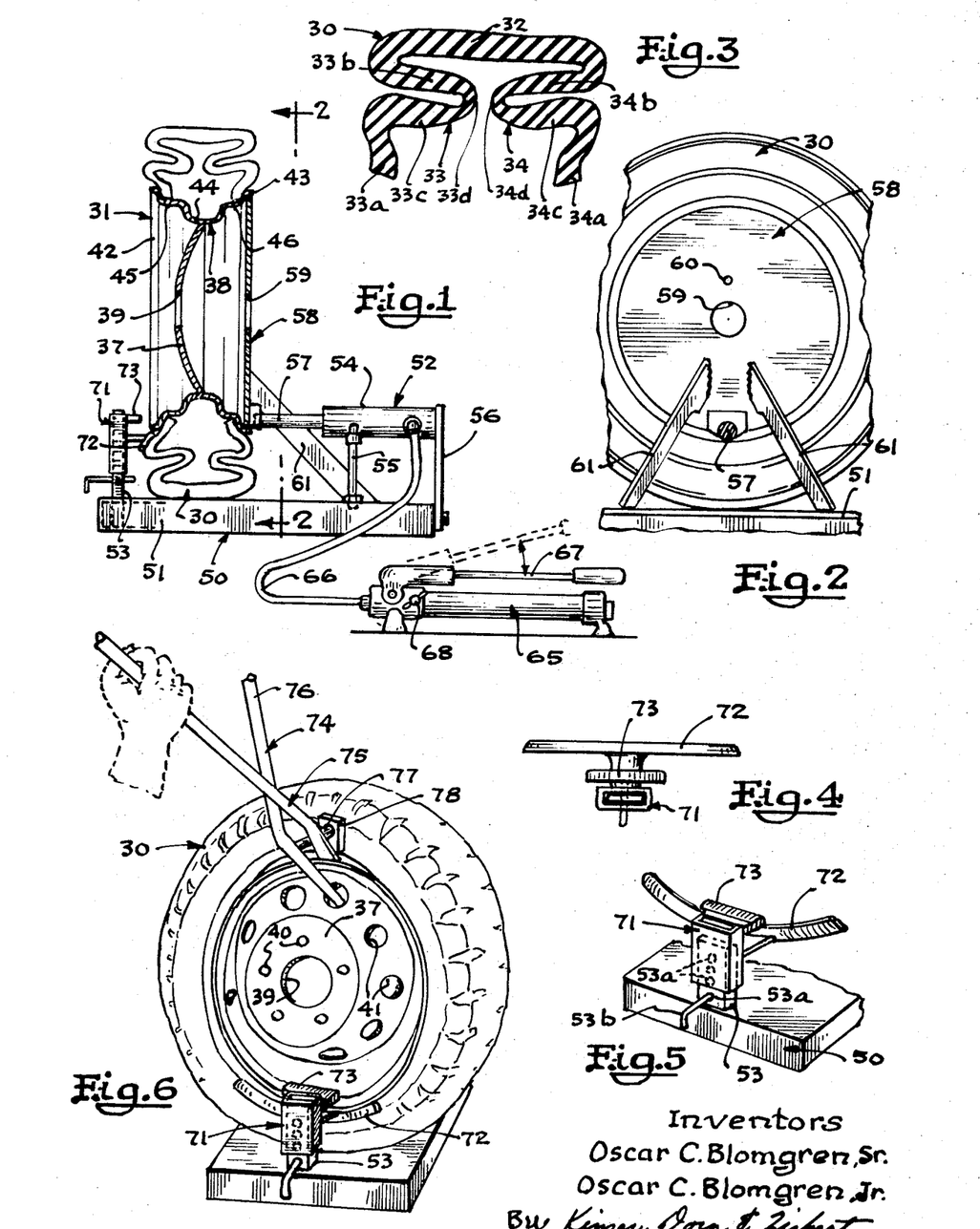
FIG. 1 is an elevational view of the tire changing apparatus of the invention, illustrating a tire in cross section arranged to break the tire bead from the front rim.
FIG. 2 is an elevational view of the ram-operated disc of the tire changing stand taken substantially along line 2—2 of FIG. 1.
FIG. 3 is an enlarged cross sectional view of a run flat combat tire.
FIG. 4 is a top plan view of the bead breaking shoe and the locking lug arrangement.
FIG. 5 is a detail perspective view of the bead breaking shoe and locking lug arrangement.
FIG. 6 is an elevational view of a tire and wheel assembly placed on the tire changing apparatus looking at the front of the assembly, and illustrating the use of the tire depressor and a tire iron in the removal of the front tire bead from the front rim.
Figure 7:
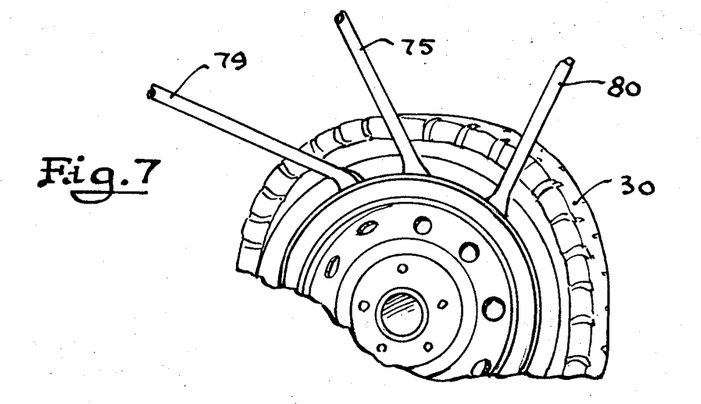
FIG. 7 to 10 are fragmentary front elevational views of a tire and wheel assembly illustrating the use of tire irons in successive steps as employed for removing the front bead over the front rim.
Figure 8:
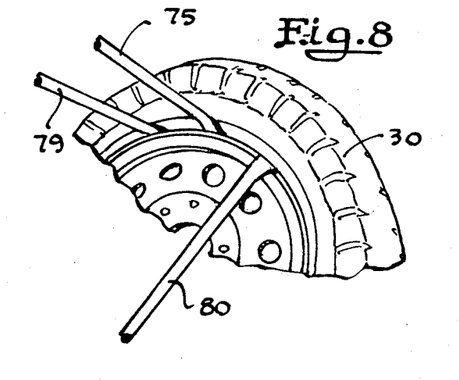

Referring now to the drawings, and particularly to FIGS. 1 and 3, the cross section of a tubeless run flat tire 30 is shown, and the cross section of the center drop wheel 31 is shown which is of the type on which a run flat tire will be mounted as shown in FIG. 1. In FIG. 1 the tire is illustrated as being in deflated condition wherein the side walls are folded inwardly. The run flat tire 30 is mounted and demounted from the wheel when it is in deflated condition as is usual with all tubeless tires.

The tire 30 includes a tread wall 32, opposed side walls 33 and 34, which extend from the opposite sides of the tread wall and terminate in beads 33a and 34a. The side walls 33 and 34 include first and second side wall portions 33b, 33c, 34b and 34c, the side wall portions being interconnected and creased at 33d and 34d. The shape of the run flat tire in deflated condition is like that illustrated in FIGS. 1 and 3 wherein the side wall portions of the side wall are folded toward each other under the tread wall to define a cushion support for the tread wall between the tread wall and the beads. When the tire is inflated on a wheel, the side wall portions unfold, thereby driving the tread wall radially outwardly and the side wall portions effectively assume an outwardly bowed shape as with any normal tire. But once the tire is deflated, the side wall portions fold inwardly, thereby pulling the tread wall radially inwardly to the position shown in FIGS. 1 and 3.

The wheel 31 onto which the tire is to be mounted is of the usual drop center type, and includes a hub 37 dished in one direction which defines the front of the wheel and is mounted in the center of an annular tire supporting structure 38. The hub 37 as seen in FIGS. 1 and 6 includes a central opening 39 around which are located a plurality of bolt holes 40, and around which are arranged a plurality of brake ventilating holes 41. The tire supporting structure includes front and back rims 42 and 43 on opposite sides of the centrally arranged drop center groove 44. Bead lands 45 and 46 coact with the front and back rims and maintain the beads in proper position on the wheel. It can be seen in FIG. 1 that the drop center groove 44 is spaced radially inwardly from both the rims and the bead lands, this drop center groove facilitating the mounting and demounting of the tire, as will be more clearly hereinafter described.

FIGS. 1 to 11 show various steps taken during the demounting of a run flat tire from a wheel when using the tire changing apparatus and method according to the present invention. In FIG. 1 a tire stand 50 of the apparatus includes a heavy base plate 51, onto which is mounted a hydraulic ram 52 and a bracket support 53.

The hydraulic ram 52 includes a cylinder 54 mounted above the base plate by support bars 55 and 56, and a piston 57. The axis of the cylinder and piston is parallel to the base plate 51. Secured firmly to the free end of ram 57 is a disc 58 sized to be received within either rim of the wheel as shown in FIG. 1 in connection with the rear rim 43 and to abut against the corresponding bead land. The disc 58 includes a centrally located opening 59 and bolt holes 60, the purpose of which will be later described. While the disc is supported by the ram piston 57, a pair of guide bars 61, FIGS. 1 and 2, are secured to the disc and extend downwardly to the top surface of the base plate 51 and slidably guide along a surface of the base plate as the diac is moved toward and away from the ram 52. It should be appreciated the disc 58 serves to engage within the rim on either side of the wheel and it may be otherwise constructed to effect the same purpose. For example, it could include a center hub with an opening and bolt holes and arms extending outwardly to engage the wheel rim.

The ram 52 is powered by a conventional manually operable hydraulic pump 65 connected to the ram by a hydraulic line 66. Operation of the pump handle 67 and adjustment of the control valve 68 allows working of the ram 52 to urge the ram piston 57 and disc away from the ram cylinder 54. When it is desired to return the disc toward the ram, operation of the control valve 68 will allow relieving the pressure on the ram and return of the disc.

Carried on the bracket support 53 is a combination adjustable bead breaker and wheel locking member 71 that includes a bead breaking shoe 72 and a wheel locking bar 73. The member 71 is mounted on the post or bracket 53 so that it may be adjusted vertically to properly position the bead breaking shoe by the vertically spaced holes 53a and the pin 53b, as seen in FIG. 1, so that it engages the side wall of the tire directly adjacent to the rim of the wheel. The adjustability of the bead breaker on the post allows spacing variation relative the base, since variation in distance between rim and tire tread will be experienced with various tires, some of which are more worn than others. The bead breaking shoe is elongated and formed to properly engage a sufficient part of the tire during the bead breaking operation. It can be appreciated here that the bead may be broken from the wheel by positioning the tire and wheel onto the stand, as shown in FIG. 1, with the front side wall of the tire engaging against the bead breaking shoe 72 and the disc 58 in position against the rear side of the wheel 31. Operation of the ram 52 to force the entire wheel and tire assembly toward the bead breaker and locking member 71 will ultimately permit breaking of the front bead from the front wheel rim. It should be appreciated that prior to breaking of the bead the tire will be in a deflated condition. Following breaking of the lower front bead, the hydraulic pump 65 will be operated to release its valve and allow retraction of the ram and disc so that the tire may be rotated until a portion of the bead not broken from the wheel is in alignment with the bead breaking shoe, after which repeating of the bead breaking operation will enable further breaking of the front bead from the front rim.

Thereafter, it is intended to next remove the front bead from the wheel by forcing it over the wheel rim and to do so the first step involves applying pressure to the disc 58 and advancing the tire toward the bead breaker and locking member 71 until the wheel locking bar 73 overlies the front wheel rim 42. In this position, the bead breaking shoe 72 forces the tire bead at the lower end into the drop center 44 of the wheel and coacts with the locking bar 73 to anchor the wheel and tire to the tire stand, as shown in FIG. 6.

Figure 9:
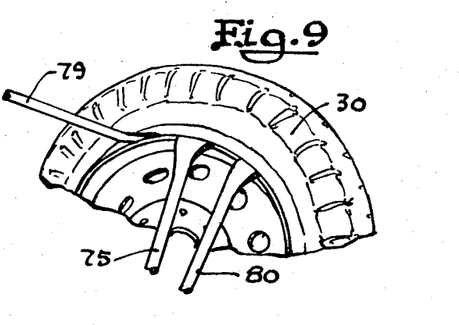
Figure 10:
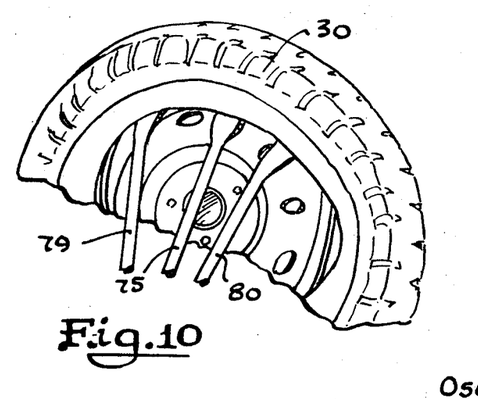

A bead depressing tool 74 is next applied to the wheel at the top front side, as shown in FIG. 6, to depress the bead from the front rim 42 and permit the insertion of a first tire iron 75. The bead depressor 74 includes a long arm 76 having a short arm 77 extending therefrom and terminating with a bead shoe 78. As shown in FIG. 6, the lower end of the main bead depressor arm 76 is inserted into a vent hole 41 of the wheel for anchorage. Similarly, two more tire irons 79 and 80 are inserted on opposite sides of the first tire arm 75, as shown in FIG. 7, again by using the bead depressor to allow insertion of the irons. Depressing the right hand iron 80, FIG. 8, the bead at that point is forced out over the front rim. Next, the center tire arm 75 is depressed, as shown in FIG. 9, to force the bead at that point out over the rim and finally the leftmost tire arm 79 is depressed as shown in FIG. 10 to force that part of the bead out over the rim. At this point, 30 to 40 percent of the bead will be out of the wheel.

Figure 11:
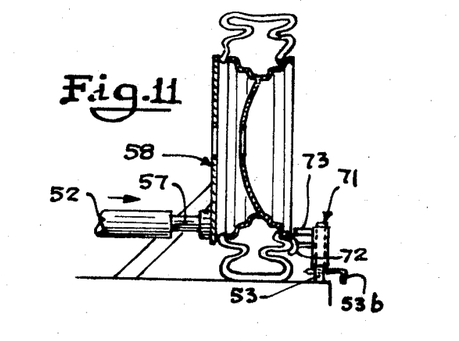
FIG. 11 is a view illustrating the tire and wheel assembly mounted for breaking the rear tire bead from the wheel rim.

The ram disc 58 is then released so that the tire and wheel may be removed from the tire stand and placed on the floor in a horizontal position with the front side of the tire and wheel facing upwardly. COntinued use of the bead depressor and tire irons will then allow complete removal of the front bead from the tire wheel. The tire and wheel assembly is then reinserted in the tire stand with the backside of the wheel and tire assembly facing the bead breaking shoe 72, as shown in FIG. 11, wherein the ram is operated to break the back bead from the back rim. Following breaking of the back bead from the rim, the ram disc is released to allow removal of the tire and wheel assembly from the tire stand, after which removal of the wheel from the tire is accomplished very easily by use of tire irons. At this point, it should be appreciated that the rear bead which is still on the wheel will move into the drop center of the wheel permitting maneuvering of the wheel to enable it to be easily removed from the tire.

Referring now to FIGS. 12 to 24, mounting of a run flat tire onto a wheel is illustrated in step-by-step fashion in connection with the tire mounting apparatus of the invention, it being appreciated that the stiffness of a run flat tire necessitates special handling.

Figure 12:
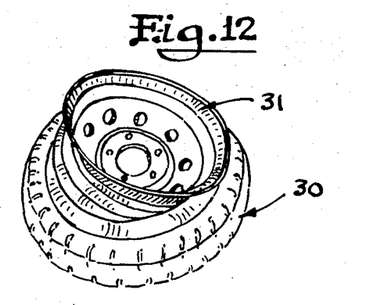
FIG. 12 is a perspective view illustrating the manner of starting the wheel into a run flat combat tire during the process of mounting the tire on the wheel.
Figure 13:
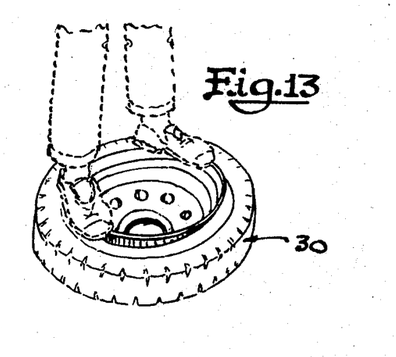
FIG. 13 is a perspective view of the tire and wheel and illustrating the step of a person standing on the wheel to force the wheel into the tire wherein the rear rim is in proper position with respect to the rear bead of the tire.
Figure 14:
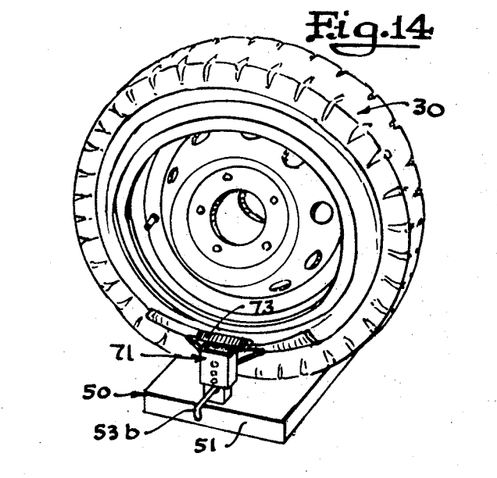
FIG. 14 is a front perspective view illustrating the mounting of the tire and wheel assembly onto the tire changing apparatus of the invention where the front bead is outside of the front rim.

The first step is to place the tire 30 onto the floor in horizontal position and to then position the wheel with the backside up so that a part of the front rim is arranged within the rear bead of the tire and where the rear bead is essentially positioned in a part of the drop center of the wheel, such as is shown in FIG. 12. Next, by applying a force onto the backside of the wheel, such as by standing on the back rim of the wheel as shown in FIG. 13, the wheel will drop into place so that the entire rear bead of the tire is then positioned between the front and back rims of the wheel. It is now necessary to proceed and apply the front bead of the tire over the rim so that it is arranged inside the front rim of the wheel, and to do so resort is had to the tire mounting apparatus of the invention. It should be further appreciated that prior to mounting of the wheel onto the tire, the valve stem would be checked and possibly replaced to be certain that it would not cause any leakage problems. Further, it is preferable to lubricate the surface of the tire stand base 51 in the area between the bead shoe bracket and the steel disc so that it will easily slide across the base when pressure is applied to the disc rim. the tire beads and the wheel rim flanges are coated with a commercial tire lubricant to ease the mounting of the tire on the wheel.

The partially mounted tire and wheel assembly is then placed on the tire stand 50 so the tire and wheel assembly are arranged in a vertical or upright position and the backside of the assembly faces the disc. Further, it is preferable to lubricate the surface of the tire stand base 51 in the area between the bead shoe bracket and the steel disc so that it will easily slide across the base when pressure is applied to the disc rim.

Figure 15:
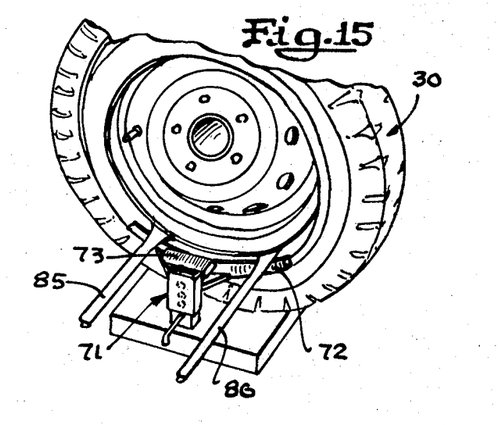
FIG. 15 is a view similar to FIG. 14 illustrating the next step wherein the tire irons are used to enable the lower part of the front bead to be partially mounted onto the wheel.
Figure 16:
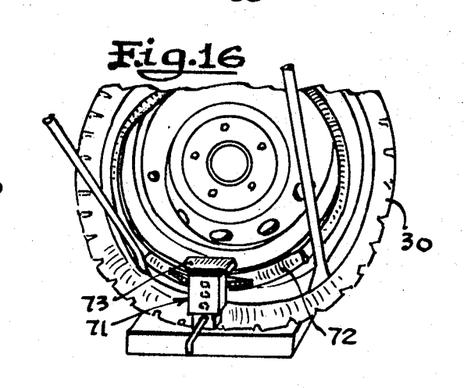
FIG. 16 illustrates the locking of the bead shoe and locking lug onto the rim of the wheel.
Figure 17:
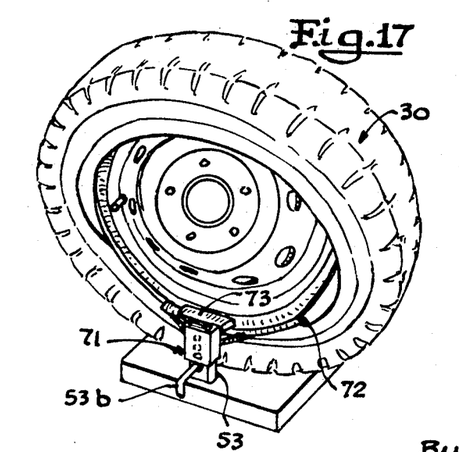
FIG. 17 shows the condition of the tire relative to the wheel when the lower part of the bead is forced onto the front wheel rim.

The tire and wheel assembly is placed on the tire stand so that the back side of the wheel is engaged by the steel disc 58. The ram is pumped until the steel disc is in engagement with the rear rim of the wheel. Two tire irons 85 and 86 are inserted between the lower bead of the tire and the front rim against the bead breaking shoe 72 and at the outside of the locking bar 73, as shown in FIG. 15. Depressing of the tire irons forces the bead to a position whereby it will slip onto and over the front rim upon further advancing of the tire and wheel assembly toward the bead breaker and locking member 71. Further advancing of the wheel and tire assembly causes the locking bar 73 to engage over the front rim to thereby lock the tire and wheel assembly to the tire stand, as shown in FIGS. 16 and 17. At this point, the bead breaking shoe 72 is located under the front rim to coact with the locking bar and lock the tire and wheel assembly in place.

Figure 19:
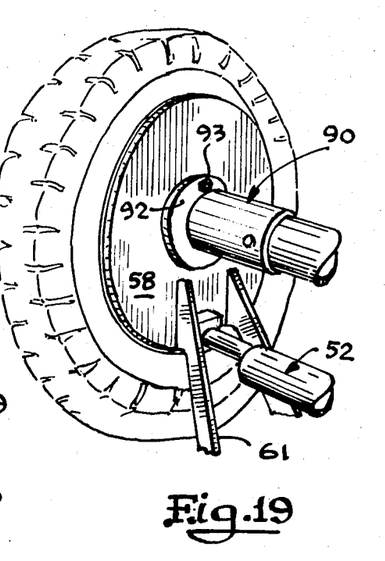
FIG. 19 illustrates the back view of the tire and wheel and the apparatus as taken along line 19—19 of FIG. 18.
Figures 21, 23, 25:
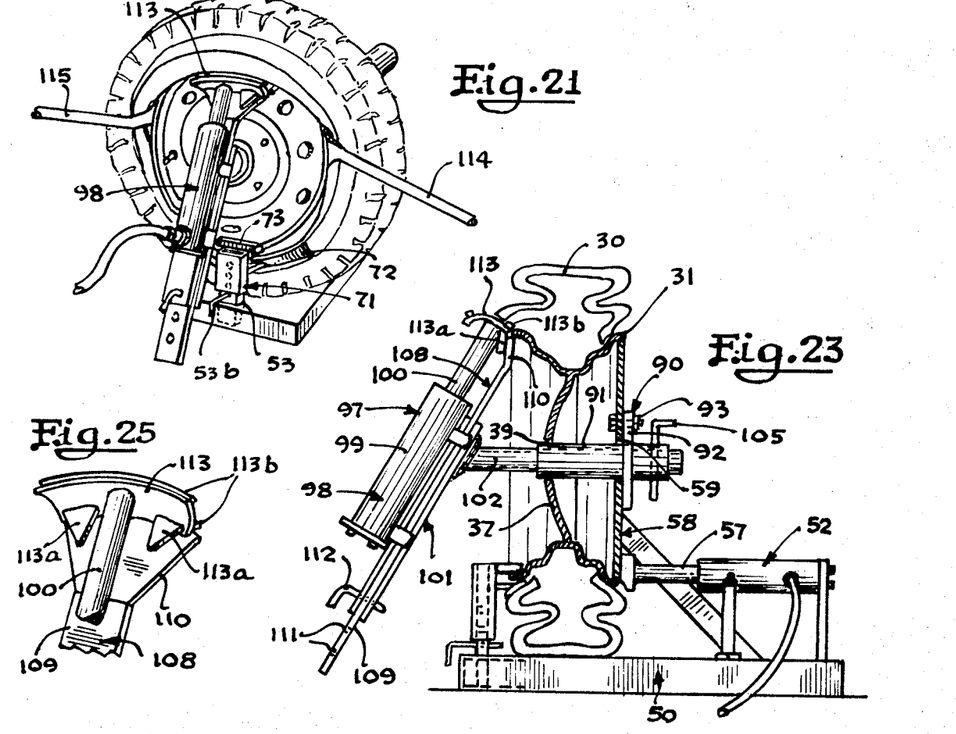
FIG. 21 is a front view of the wheel and tire assembly illustrating the manner of urging a part of the bead over the wheel rim by the tire irons when the bead ram is activated.
FIG. 23 is a cross sectional view of the tire and wheel assembly to illustrate the bead rum and bead guide mechanism in position.
FIG. 25 is an enlarged fragmentary top persepctive view of the bead ram shoe and guide.
Figure 24:
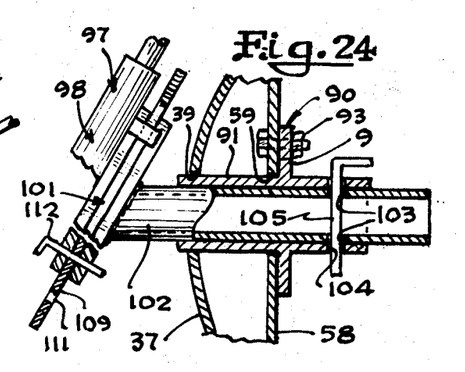
FIG. 24 is an enlarged fragmentary sectional view illustrating the mounting connection between the bead ram tube and the support tube extending from the disc and through the wheel hub.

From the rear of the tire stand a bead ram support 90 in the form of a tube 91 having a flange 92 thereon is inserted through the hole 59 of the steel disc 58 and through the opening 39 in the wheel hub 37, as particularly seen in FIGS. 19, 23 and 24. The flange 92 abuts against the steel plate and is bolted in place thereon by bolt assemblies 93. Accordingly, the support 90 becomes firmly anchored to the disc 58 and the wheel 31.

From the front of the tire and wheel assembly, a bead ram unit 97 is mounted in place on the bead ram support 90 for the purpose of forcing the top side of the front tire bead up over the top part of the front rim of the wheel. The bead ram unit 97 includes a ram 98 defined by a ram cylinder 99 and a ram piston 100 carried on a channel-shaped base 101 that is, in turn, mounted on a bead ram tube 102 which is sized to telescopically insert in the bead ram support 90, as shown in FIGS. 23 and 24. In order to prevent relative sliding movement between the bead ram tube 102 and the bead ram support 90, a pair of aligned pin holes 103 are provided in the bead ram tube and which when in aligned relation with pin holes 104 of the bead ram support 90 can receive a locking pin 105, as particularly seen in FIGS. 23 and 24. Thus, the bead ram unit 97 is anchored to the bead ram support 90 where it will not slide relative to the support or rotate relative thereto when it is being operated to force the bead over the tire rim.

A bead ram guide 108 defined by an enlongated bar 109 having a fan-shaped, widened bead guide head 110 at one end is adjustably mounted in the channel 101. The bead guide head 110 is slightly angularly displaced from the bar 109. A plurality of holes 111 are formed in the bar 109 for alignment with holes formed in the channel 101 to receive a lock pin 112, as shown in FIGS. 20 to 24, thereby enabling adjustment. The bead ram guide is adjusted in position relative to the channel 101 so that the free end of the bead guide head 110 engages against the front rim of the wheel, as seen in FIG. 23, so as to provide a guiding surface over the front rim for the bead.

Figure 18:
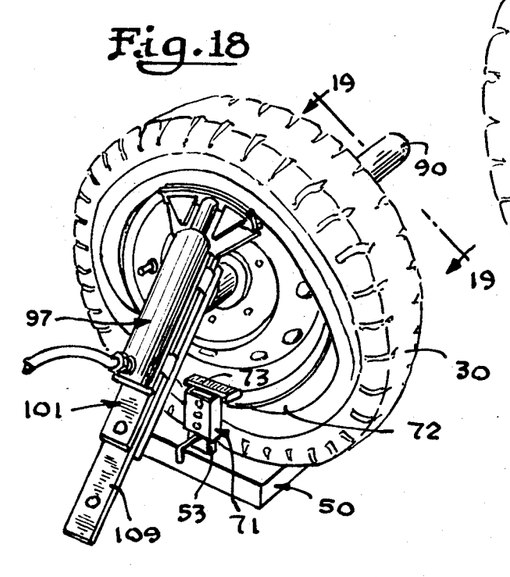
fig. 18 illustrates the next step where the bead ram and bead guide are shown in position for forcing FIG. upper part of the bead over the front rim.
Figure 20:
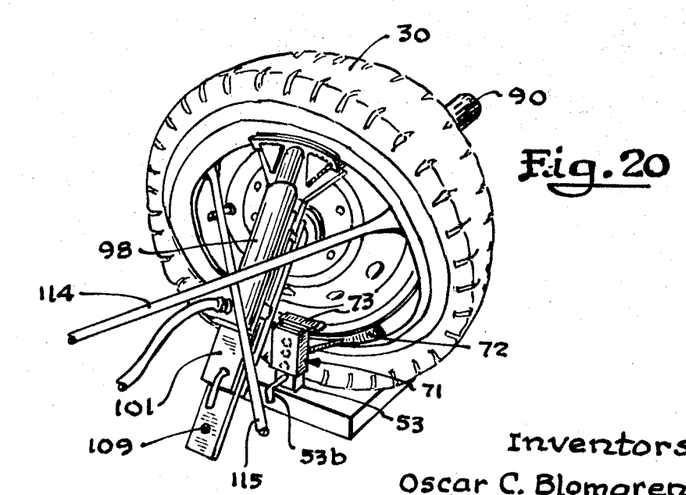
FIG. 20 is a view similar to FIG. 18, but illustrating the placing of tire irons during the step of forcing the upper part of the front bead over the front wheel rim.

At the outer end of the ram piston 100, a bead shoe 113 is mounted and adapted to engage the front bead of the tire and force it over the front rim during the mounting procedure as particularly seen in FIGS. 18, 20 and 21. Triangular stabilizing plates 113a extend from the rear of the shoe and engage the guide heel 110 and prevent the shoe 113 from twisting sideways. Bars 113b are provided on the face of the shoe 113 to positively contain the tire bead on the shoe when engaging same as shown in FIG. 23.

Figure 22:
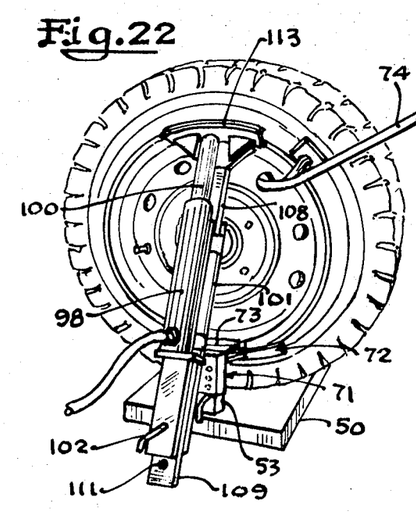
FIG. 22 is a view illustrating the further use of the bead depressor tool to complete the mounting of the bead onto the wheel.

Two tire irons 114 and 115 are used to assist in guiding the front bead over the front rim of the wheel and they are placed in X'd relation with the lips of the irons engaging between the bead and rim, as shown in FIG. 20, and the tire arms resting on the bead rim 98. As illustrated in FIG. 20, one tire arm engages between the tire and wheel to the right of the bead ram shoe while the other engages to the left of the shoe at approximately the 9:30 and 2.30 o'clock positions. The bead ram 98 is then pumped until the bead shoe 113 has forced the bead to a position so that it can easily slip over the front rim of the wheel. The tire irons 114 and 115 are moved as shown in FIG. 21 to assist in urging the bead over the rim. With the bead ram shoe in extended position, the bead depressor 74 is again used to urge the final portion of the upper bead over the rim of the wheel, as shown in FIG. 22. This will complete the assembly of the tire onto the wheel and it may then be removed from the tire changing apparatus and inflated.

It will be understood that modifications and variations may be effected without departing from the scope of the novel concepts of the present invention, but it is understood that this application is to be limited only by the scope of the appended claims.

The invention is hereby claimed as follows:

1. Tire changing apparatus for assembling and disassembling a run flat tubeless tire and a drop center wheel, wherein the tire includes a tread wall and opposed side walls extending therefrom and terminating in beads which are adapted to engage the wheel and the wheel includes a hub having a central opening and a drop center groove portion on the hub having rims at opposite sides thereof, said apparatus comprising, a base including a plate onto which the tire and wheel assembly stands in a vertical position, a hydraulic ram mounted on the plate including a piston means for driving said ram, a disc carried on the piston and sized to engage and be received within the rim on one side of the wheel to apply a horizontal force to the wheel, post means mounting a bead breaking shoe on the plate in spaced relation to the disc to engage a tire side wall adjacent the bead thereof and the rim of the opposite side and hold the engaged portion of the tire stationary when applying a force to the disc to break the bead of the engaged portion of the tire from the rim, said bead breaking shoe being in the form of a bar and engaging a portion of the tire side wall adjacent the plate thereby leaving the remainder of the tire side wall and rim open, and rim locking means in the form of a bar on said post means coacting with the bead breaking shoe and the disc to engage the rim and lock the tire and wheel combination to the plate when the ram has moved the rim into engagement with said locking means.

2. Tire changing apparatus as defined in claim 1, wherein said bead breaking shoe and said rim locking means are mounted on a bracket that is vertically adjustable on said post.

3. Tire changing apparatus as defined in claim 1, and guide bars secured to said disc and extending to said plate to assist in guiding movement of the disc.

4. Tire changing apparatus as defined in claim 1, wherein said disc includes a central opening aligning with the central opening of the hub, a bead mounting means including a tube support extending through the central opening in the disc and the central opening of the wheel hub, means fastening said tube support to the disc, a bead ram tube slidably received in said tube support, a bead ram mounted on the bead ram tube, means locking the bead ram tube to the tube support, and a bead guide carried by the bead ram tube to coact with the bead ram in guiding the bead onto the wheel.

5. Tire changing apparatus as defined in claim 4, wherein said bead ram includes a piston onto which a bead shoe is secured for engaging the bead.

6. A method of demounting a run flat tire from a drop center wheel comprising the steps of vertically positioning the tire and wheel assembly on a tire stand with a bead breaking shoe mounted on the stand to engage the tire side wall on one side adjacent the wheel rim, applying force to the wheel from the opposite side to drive the wheel toward the bead breaking shoe to break the bead from the wheel rim, releasing the force at the opposite side, rotating the wheel and breaking the bead circumferentially of the wheel, locking the tire and wheel assembly to the stand, depressing the side wall of the tire away from the wheel rim, and inserting tire arms to force the bead out over the wheel rim.

7. A method of mounting a run flat tire onto a drop center wheel comprising the steps of commencing with one bead of the tire arranged on the wheel, vertically standing and positioning the tire and wheel assembly on a tire stand so that a stationary bead shoe in the form of a bar is aligned with the lower end of the tire side wall, inserting tire irons between the wheel rim and lower part of the bead and holding the irons against the bead shoe, forcing the assembly toward the bead shoe to force the lower part of the bead along the tire irons over the rim and onto the wheel, removing the tire irons and inserting said tire irons at the upper part of the wheel between the bead and wheel at about the 10 and two o'clock positions, mounting a bead ram and bead guide onto the wheel to engage and force the upper part of the bead diametrically opposite the bead shoe onto the wheel, operating the bead ram to force the upper part of the bead onto the wheel, operating the tire irons to force additional parts of the bead onto the wheel, and using a bead depressor to depress the other parts of the bead onto the wheel.

\* \* \* \* \*

UNITED STATES PATENT OFFICE
CERTIFICATE OF CORRECTION

Patent No. 3,746,069                    Dated July 17, 1973

Inventor(s) Oscar C. Blomgren, Sr. and Oscar C. Blomgren, Jr.

It is certified that error appears in the above-identified patent and that said Letters Patent are hereby corrected as shown below:

Col. 1, line 8, change "tubless" to --tubeless--;
Col. 3, line 47, change "fig." to --FIG.--;
Col. 3, line 48, change "FIG." to --the--;
Col. 3, line 64, change "rum" to --ram--;
Col. 5, line 3, change "diac" to --disc--;
Col. 6, line 18, change "COntinued" to --Continued--;
Col. 6, lines 57 to 61, delete "it is preferable to lubricate the surface of the tire stand base 51 in the area between the bead shoe bracket and the steel disc so that it will easily slide across the base when pressure is applied to the disc rim.";
Col. 7, line 47, change "where" to --wherein--;
Col. 8, line 14, change "2.30" to --2:30--; and
Col. 10, lines 17 and 18, change "uppper" to --upper--.

Signed and sealed this 27th day of November 1973.

(SEAL)
Attest:

EDWARD M. FLETCHER, JR.            RENE D. TEGTMEYER
Attesting Officer                  Acting Commissioner of Patents